(12) United States Patent
Carmel et al.

(10) Patent No.: US 9,231,834 B2
(45) Date of Patent: Jan. 5, 2016

(54) BUNDLING CONFIGURATION ITEMS INTO A COMPOSITE CONFIGURATION ITEM

(75) Inventors: Yuval Carmel, Tel Aviv (IL); Ary Dvoretz, Ganey Tikva (IL); Ido Ish-Hurwitz, Kfar-Saba (IL); Doron Tvizer, Yehud (IL); Oded Zilinsky, Yehud (IL); Sergey Steblin, Ramat Gan (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 352 days.

(21) Appl. No.: 13/696,411

(22) PCT Filed: May 27, 2010

(86) PCT No.: PCT/US2010/036317
§ 371 (c)(1),
(2), (4) Date: Nov. 6, 2012

(87) PCT Pub. No.: WO2011/149464
PCT Pub. Date: Dec. 1, 2011

(65) Prior Publication Data
US 2013/0055090 A1 Feb. 28, 2013

(51) Int. Cl.
G06F 11/32 (2006.01)
H04L 12/24 (2006.01)
G06F 11/30 (2006.01)

(52) U.S. Cl.
CPC ............ *H04L 41/22* (2013.01); *G06F 11/3051* (2013.01); *G06F 11/328* (2013.01); *H04L 41/085* (2013.01); *H04L 41/0893* (2013.01)

(58) Field of Classification Search
CPC ............ Y10S 715/969; H04L 41/0893; G06F 11/328; G06F 11/3051; G06F 3/0484

USPC ................................................... 715/734, 853
See application file for complete search history.

(56) References Cited

U.S. PATENT DOCUMENTS

| | | | |
|---|---|---|---|
| 6,952,208 B1 * | 10/2005 | Arquie et al. ................. | 345/440 |
| 7,124,369 B2 * | 10/2006 | Beaudoin ...................... | 715/738 |
| 7,822,785 B2 * | 10/2010 | Ayachitula et al. ........... | 707/804 |
| 8,307,327 B2 * | 11/2012 | Delima et al. ................ | 717/105 |
| 8,612,486 B2 * | 12/2013 | Maheshwari et al. ........ | 707/798 |
| 8,862,996 B1 * | 10/2014 | Vijendra et al. .............. | 715/734 |

(Continued)

FOREIGN PATENT DOCUMENTS

CN 101427219 A 5/2009

OTHER PUBLICATIONS

H. Madduri et al, A Configuration Management Database Architecture In Support Of IBM Service Management, IBM Systems Journal, vol. 46, No. 3, 2007, 17 Pages.

(Continued)

*Primary Examiner* — Nicholas Ulrich
(74) *Attorney, Agent, or Firm* — Hewlett Packard Enterprise Patent Dept.

(57) ABSTRACT

A configuration management system bundles configuration items representing corresponding information technology components into composite configuration items, where each of the composite configuration items has plural associated configuration items. The configuration management system presents the composite configuration items for visualization, where the visualization specifies relations among the composite configuration items based on relations among the configuration items.

20 Claims, 7 Drawing Sheets

(56) References Cited

U.S. PATENT DOCUMENTS

| | | | |
|---|---|---|---|
| 2003/0103077 A1* | 6/2003 | Despotidis et al. | 345/734 |
| 2005/0050471 A1* | 3/2005 | Hallisey et al. | 715/734 |
| 2005/0114479 A1 | 5/2005 | Watson-Luke | |
| 2006/0037000 A1* | 2/2006 | Speeter et al. | 717/120 |
| 2006/0059428 A1* | 3/2006 | Humphries et al. | 715/734 |
| 2006/0179116 A1* | 8/2006 | Speeter et al. | 709/217 |
| 2007/0204231 A1* | 8/2007 | Cunningham et al. | 715/734 |
| 2007/0226629 A1* | 9/2007 | Dieberger et al. | 715/734 |
| 2008/0005143 A1 | 1/2008 | Ayachitula et al. | |
| 2008/0005186 A1 | 1/2008 | Ayachitula et al. | |
| 2008/0005187 A1 | 1/2008 | Ayachitula et al. | |
| 2008/0065756 A1* | 3/2008 | Hardwick et al. | 709/224 |
| 2008/0094399 A1* | 4/2008 | Heinkel et al. | 345/440 |
| 2010/0179945 A1* | 7/2010 | Rangarajan et al. | 707/694 |
| 2010/0306275 A1* | 12/2010 | Maheshwari et al. | 707/803 |
| 2011/0238658 A1* | 9/2011 | Schimmelpfeng | 707/723 |
| 2012/0029661 A1* | 2/2012 | Jones et al. | 700/17 |

OTHER PUBLICATIONS

International Searching Authority, The International Search Report and the Written Opinion, Feb. 24, 2011, 9 Pages.

* cited by examiner

BUNDLING CONFIGURATION ITEMS INTO A COMPOSITE CONFIGURATION ITEM

BACKGROUND

An information technology (IT) infrastructure of an enterprise (e.g., a company, an educational organization, a government agency, etc) can include a wide variety of electronic devices, associated software components, and database components. A configuration item can be employed to define a configuration of an electronic device, a software component, or a database component. A "configuration" can include an attribute associated with an electronic device (or a portion of the electronic device), an attribute associated with a software component, and/or an attribute associated with a database component

BRIEF DESCRIPTION OF THE DRAWINGS

Some embodiments of the invention are described with respect to the following figures.

DETAILED DESCRIPTION

Figure 1:
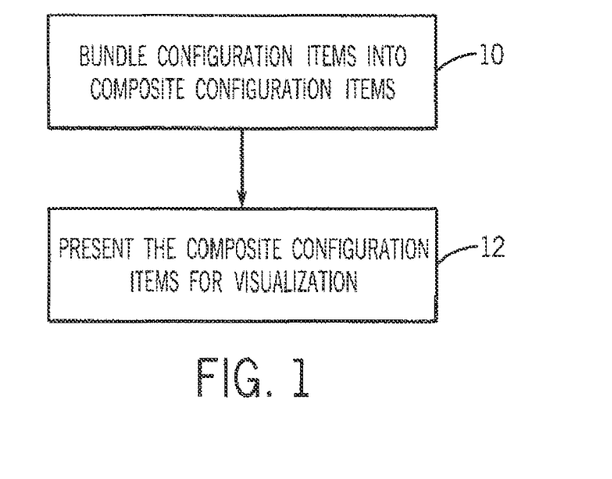
FIG. 1 is a flow diagram of a configuration item management process according to some embodiments.

Generally, a configuration management system according to some embodiments is provided to bundle configuration items for visualization. As depicted in FIG. 1, the configuration management system bundles (at 10) configuration items representing corresponding information technology (IT) components into composite configuration items, where each of the composite configuration items has multiple associated configuration items (a composite configuration item is made up of a collection or bundle of configuration items). The configuration management system presents (at 12) the composite configuration items for visualization, wherein the visualization specifies relations among the composite configuration items (two or more composite configuration items) based on relations among the configuration items. "Composite configuration item" is abbreviated as "composite CI" in the ensuing discussion. By bundling configuration items into composite CIs, the number of configuration items that have to be visualized is reduced, which makes visualization of the overall system easier.

A configuration item represents a discrete unit of a configuration relating to an electronic device (or a portion of an electronic device), a software component, and/or a database component. Examples of electronic devices include computers, storage array systems, memory devices, central processing units (CPUs), communications devices such as routers or switches, personal digital assistants (PDAs), smart telephones, and so forth. Examples of software components include operating systems, device drivers, software applications, file systems, and so forth. Examples of database components include data structures such as databases, tables, files, and so forth, used for storing data. More generally, an electronic device (or electronic device portion), software component, and/or database component is referred to as information technology (IT) component. A configuration of an IT component includes at least one attribute (e.g., speed of CPU, size of file system, type of operating system, etc.) of the IT component.

A composite CI is composed of a collection of configuration items that are related to each other. In some implementations, a composite CI is composed of a main configuration item and internal configuration items of the main configuration item. For example, the main configuration item can be a host system, while the internal configuration items can include the components of the host system, such as a CPU, a file system, an operating system, application software, a storage device, a network protocol stack, and so forth.

As some examples, an attribute associated with a configuration item that represents a configuration of an operating system can specify the type of operating system (e.g., Unix, Linux, WINDOWS®, and so forth). An attribute associated with a configuration item representing a CPU can specify a speed or manufacturer of the CPU. An attribute of a configuration item that represents a file system can specify a total size of the file system.

In an enterprise with a relatively large number of IT components, it may be relatively difficult for personnel of an IT organization to manage or understand configurations of the IT components, and/or to understand causes of problems or other issues (e.g., errors, faults, etc.) associated with the IT components. Configuration items for IT components are typically maintained by a configuration management database (CMDB). In view of the complexities associated with environments with large numbers of configuration items, any attempt to understand the environment may have to involve the assistance of a CMDB administrator who is familiar with the content of the CMDB and who is familiar with development of complex queries, such as topological query language (TQL) queries, for accessing the content of the CMDB. The queries are submitted to the CMDB to obtain information to allow IT personnel to check configurations of IT components and to understand causes of problems or other issues associated with IT components; however, development of such complex TQL queries can be time consuming and error prone.

By using the configuration management system according to some implementations, management of an environment with a relatively large number of configuration items is made easier. By bundling configuration items that are related into composite CIs, a less cluttered visualization of the environment including the configuration items can be provided (by reducing the number of configuration items that are visualized). Instead of presenting a large number of configuration items that are linked to each other in a graphical representation, the configuration management system according to some implementations is able to present a graphical representation including composite CIs that are linked to each other. This allows for easier understanding of the role of each configuration item and the relations among the configuration items. Also, if desired, the configuration management system allows for easier creation of a view that contains a collection of composite CIs. Moreover, the definition of TQL queries for accessing the CMDB containing configuration items can be simplified in view of the use of composite CIs.

Figure 2:
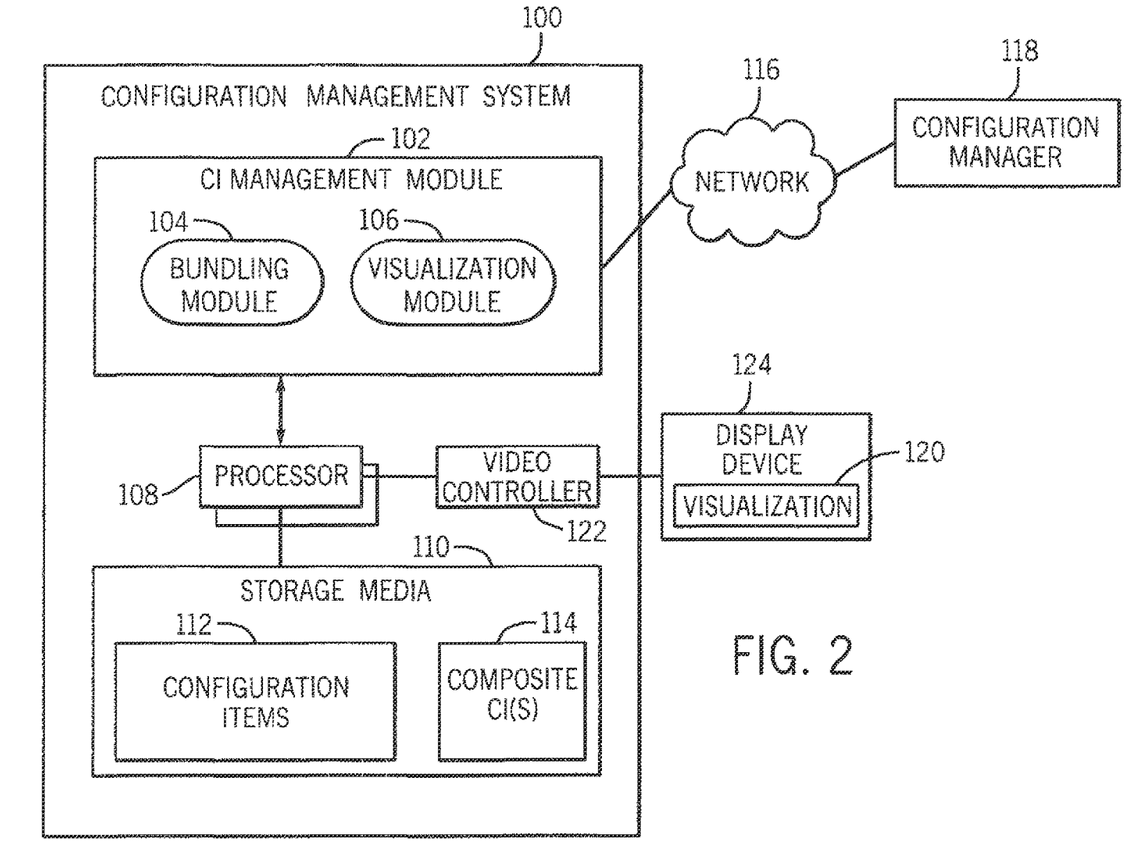
FIG. 2 is a block diagram of an example arrangement including a configuration management system according to some embodiments.

FIG. 2 is a block diagram of an arrangement that includes a configuration management system 100 having a configuration item management module 102 for managing configuration items according to some embodiments (such as according to FIG. 1). The configuration item management module 102 includes a bundling module 104 and a visualization module 106. The bundling module 104 is used to bundle related configuration items into respective composite CIs, while the visualization module 106 is used for creating graphical representations of composite CIs.

The configuration item management module 102 can be formed using machine-readable instructions executable on at least one processor 108 in the configuration management system 100 to perform tasks as discussed herein. In some implementations, the configuration management system 100 is a computer system (formed of a single computer node or multiple distributed computer nodes) that has corresponding hardware processor(s) on which machine-readable instructions are executable.

The at least one processor 108 is connected to storage media 110, which can be implemented with disk-based storage device(s) and/or semiconductor memory device(s). The storage media 110 contains information accessible by the configuration item management module 102. For example, the information stored in the storage media 110 includes configuration items 112 that can be maintained in a CMDB according to some implementations. The storage media 112 also stores composite CIs 114 formed from the configuration items 112.

In FIG. 2, the configuration management system 100 is coupled over a network 116 (e.g., local area network, wide area network, public network such as the Internet, etc.) to a remote configuration manager 118. The configuration manager 118 can be a remote client device, such as a desktop computer, notebook computer, PDA, or other device associated with a user (such as a system administrator) that is interested in managing configuration items 112.

The configuration management system 100 also includes a video controller 122 connected to processor(s) 108. The video controller 122 is responsive to data from the visualization module 106 for presenting a visualization 120 in a display device 124, where the visualization 120 can include a graphical representation of composite CIs or graphical user interface (GUI) screens containing information regarding composite CIs.

Figure 3:
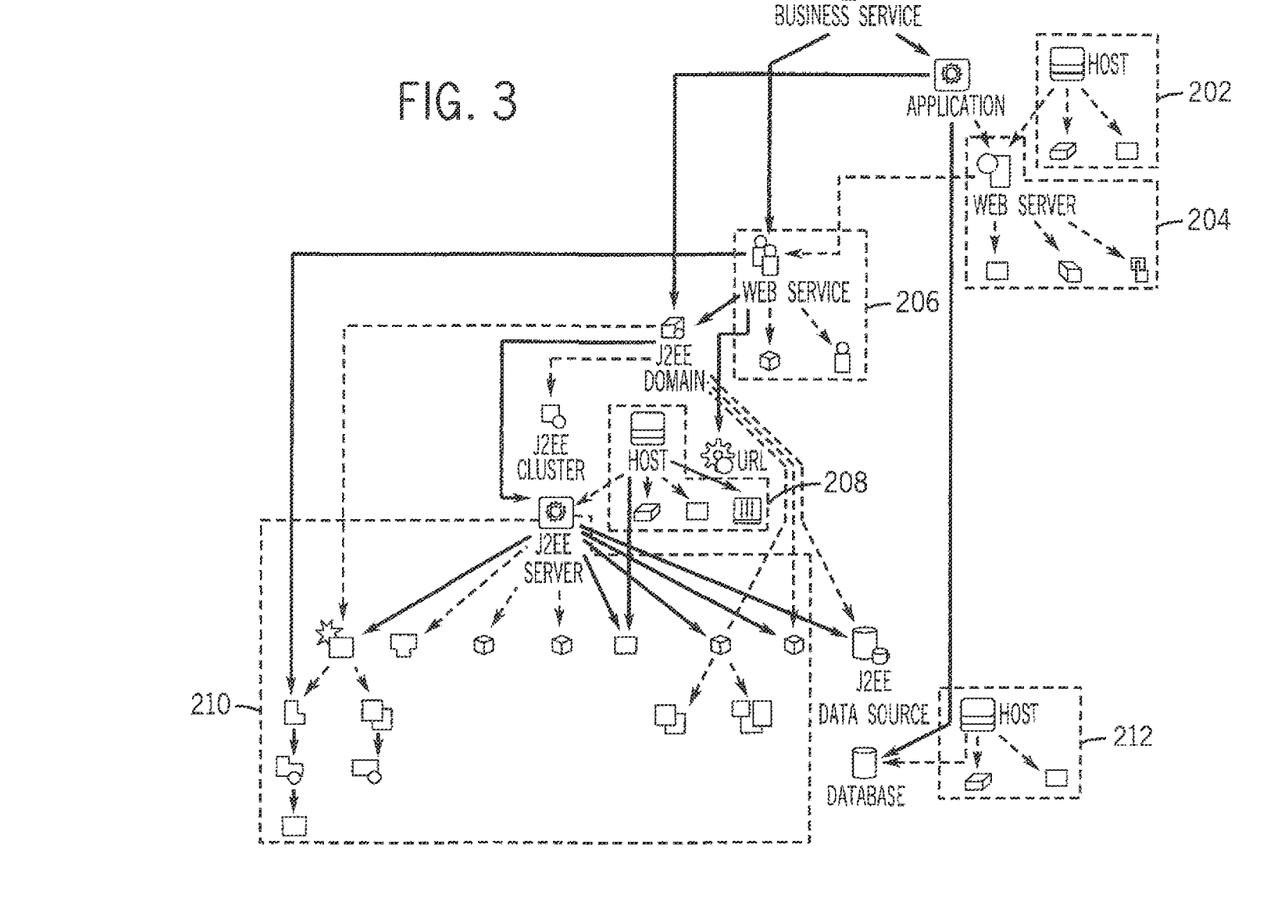
FIG. 3 is a graphical representation of linked configuration items prior to application of bundling using the configuration management system according to some embodiments.

FIG. 3 is a graphical representation of linked configuration items prior to bundling performed by the configuration management system 100 according to some implementations. Each icon in FIG. 3 represents a corresponding configuration item. Arrows (solid arrows or dashed arrows) between configuration items represent relations between configuration items. As can be seen in FIG. 3, the relatively large number of configuration items and links between the configuration items produces a relatively cluttered view that makes understanding the arrangement of configuration items relatively complicated. In a real environment, there usually can be many more configuration items depicted in the graphical representation, making the graphical representation even less understandable.

Figure 4:
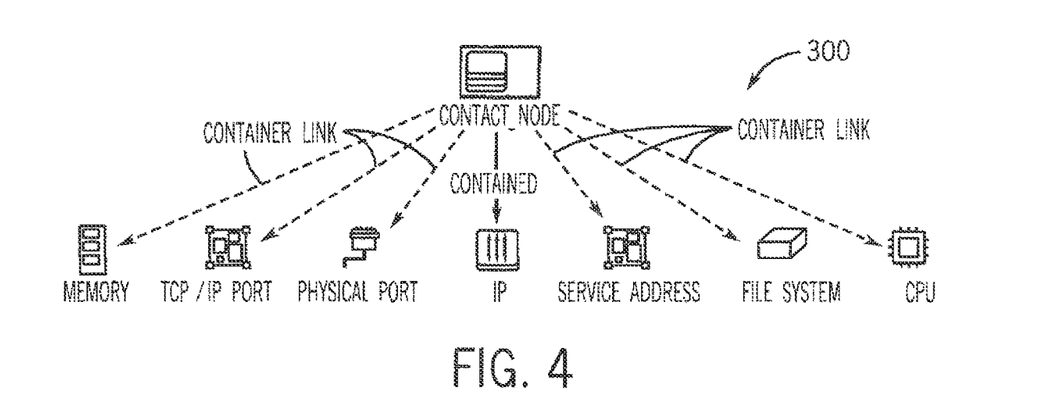
FIG. 4 is a graphical representation of an example composite configuration item that bundles related configuration items, according to some embodiments.

In accordance with some implementations, multiple related configuration items can be bundled into a corresponding composite CI, such as the composite CI 300 shown in FIG. 4. The ability to bundle configuration items into a composite CI allows an IT organization to administer the bundle (as represented by the composite CI) rather than the individual configuration items that are separately represented in the CMDB. FIG. 4 depicts the composite CI for a server computer (which has a root "CONTACT_NODE" in FIG. 4). The composite CI has a hierarchy of configuration items that includes a root and other configuration items that depend from the root. Although the FIG. 4 example shows a two-level hierarchy, it is possible for a composite CI to have a hierarchy of configuration items at more than two hierarchical levels.

A server computer as represented by the composite CI 300 typically has multiple internal components, such as memory, a network port (e.g., TCP/IP port), a physical port, a file system, a central processing unit (CPU), and/or other components. Each of the components of the server computer would be represented as separate configuration items in the CMDB. However, according to some implementations, the components of the server computer can be bundled together into the root "CONTACT_NODE" configuration item that represents the overall server computer. The CONTACT_NODE configuration item has links to corresponding components of the server computer.

There are two types of links depicted in FIG. 4: a container link that indicates that the corresponding configuration item is contained by the CONTACT_NODE configuration item. For example, the memory configuration item is contained in the CONTACT_NODE configuration item. Another type of link is the contained link, such as the link from the CONTACT_NODE configuration item to the IP (Internet Protocol) configuration item. This indicates that the CONTACT_NODE configuration item is contained by the IP configuration item.

The collection of configuration items as depicted in FIG. 4 can be bundled into the composite CI 300 of FIG. 4, wherein the composite CI 300 can be managed as a single unit. An example definition of the composite CI 300 is provided below:

```
</layers>
<composites>
    <composite citype="contact_node">
        <components>
            <component citype="node_element" relationtype="composition"
                relationfromcompositetocomponent="true" />
            <component citype="physical_port" relationtype="composition"
                relationfromcompositetocomponent="true" />
            <component citype="file system" relationtype="composition"
                relationfromcompositetocomponent="true" />
            <component citype="ip_address" relationtype="containment"
                relationfromcompositetocomponent="true" />
            <component citype="ipport" relationtype="composition"
                relationfromcompositetocomponent="true" />
            ...
        </components>
    </composite>
```

Figure 5:
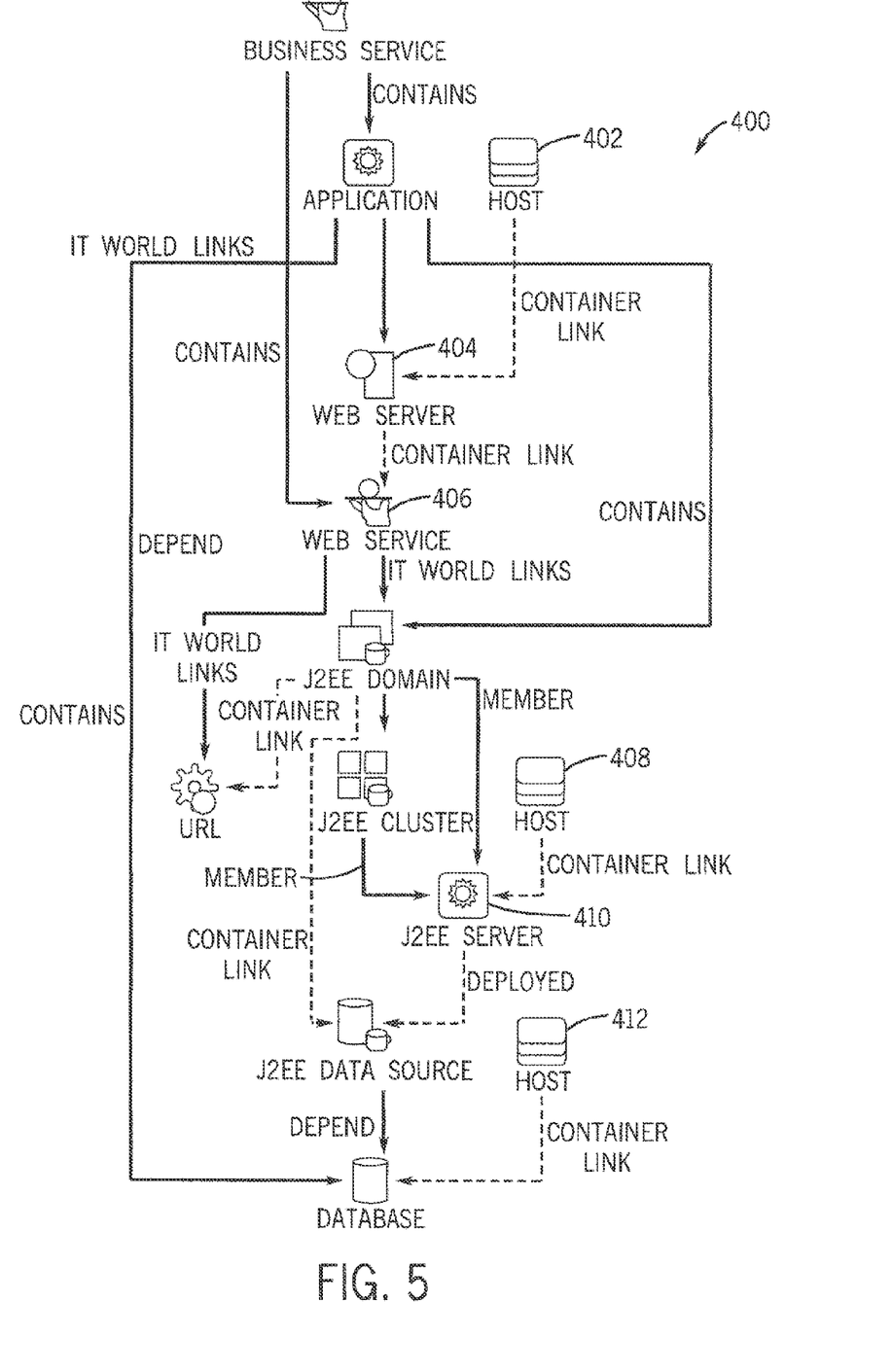
FIG. 5 is a graphical representation of example linked composite configuration items produced by the configuration management system according to some embodiments.

By bundling configuration items in the relatively cluttered graphical representation 200 of FIG. 3, a simplified graphical representation 400 is shown in FIG. 5. In FIG. 5, certain groups of the configuration items shown in FIG. 3 have been combined into respective composite CIs. The composite CIs of the graphical representation 400 include a host composite CI 402, a web server composite CI 404, a web service composite CI 406, a host composite CI 408, a J2EE server composite CI 410, and a host composite CI 412.

Other configuration items are also shown in FIG. 5, where such configuration items also appear in FIG. 3, including the following configuration items: business service, application, J2EE domain, URL, J2EE cluster, J2EE data source, and database. The foregoing configuration items were not bundled into any of the composite CIs of FIG. 5.

The host composite CI 402 contains a bundle 202 of configuration items in FIG. 3. The web server composite CI 404 contains a bundle 204 of configuration items in FIG. 3. The web service composite CI 406 contains a bundle 206 of configuration items in FIG. 3. The host composite CI 408 contains a bundle 208 of configuration items in FIG. 3. The J2EE server composite CI 410 contains a bundle 210 of configuration items in FIG. 3. The host composite CI 412 contains a bundle 212 of configuration items in FIG. 3.

In accordance with some implementations, the configuration management system 100 is able to use perspectives defined in the CMDB to add to a view, such as the view shown in FIG. 5, of configuration items. The configuration management system 100 automatically creates a perspective that receives as an input parameter the root of a composite CI and returns an enriched view including all related configuration items defined by the composite CI's hierarchy. The result is a less complex view definition TQL.

Figure 6:
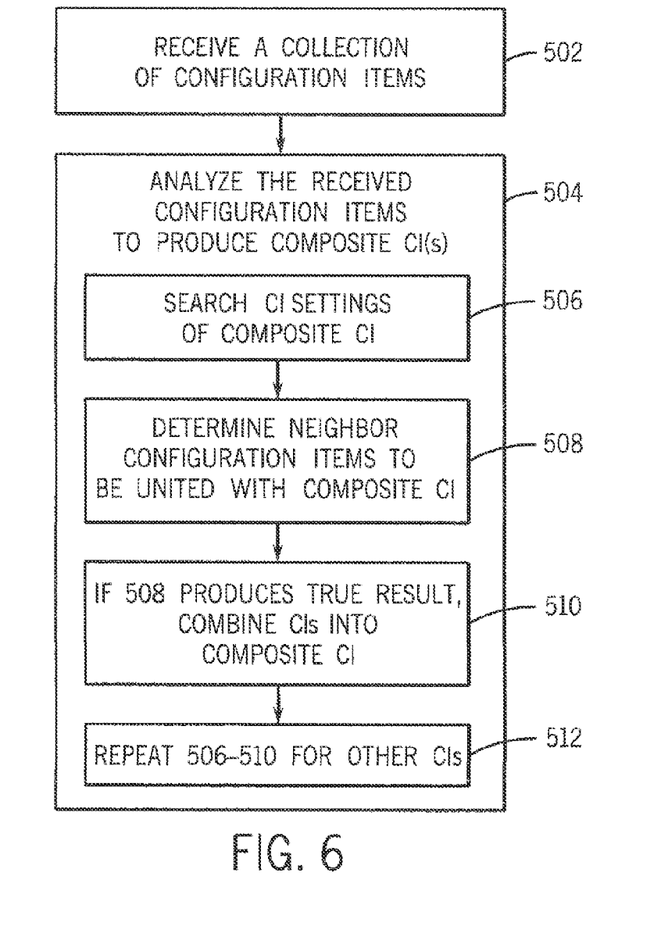
FIG. 6 is a flow diagram of a bundling process according to some embodiments.

Some tasks of the bundling module 104 of the configuration management module 102 of FIG. 2 are depicted in FIG. 6. The bundling module 104 receives (at 502) a topology of configuration items to be analyzed. The received topology of configuration items includes a set of configuration items with links between the configuration items (such as shown in FIG. 3). The bundling module 104 analyzes (at 504) the received configuration items to produce corresponding composite CI(s). Task 504 includes several sub-tasks shown in FIG. 6. Task 504 includes, for each given configuration item in the received collection of configuration items, searching (at 506) composite CI settings (e.g., attributes associated with the given composite CI) to allow a determination of which configuration items should be united with the given composite CI. After accessing the composite CI settings, the bundling module 104 next determines (at 508) from the topology what neighbor configuration items of the topology are to be united with the given composite CI. A configuration item X is considered a neighbor of configuration item Y if there is a link between X and Y. Basically, at 508, the composite CI settings are matched to topology information relating to neighbor configuration items. If the determination at 508 produces a true result, then the neighbor configuration items are combined (at 510) with the given composite CI. Otherwise, the given configuration item is left as an individual configuration item. Note that an individual configuration item that cannot be united with a composite CI can itself be identified as a composite CI. As a result of the procedure depicted in FIG. 6, the number of configuration items that have to be visualized is reduced since individual configuration items are united into composite CIs.

Note that it is possible to have a hierarchy of configuration items united to one composite CI—as a result, the analysis at 504 performs (at 512) the sub-tasks 506-510 recursively until the entire composite CI is derived. After uniting the configuration items to form composite CIs, the relations between composite CIs are united from individual relations between individual configuration items. If there are multiple relations between underlying configuration items of two composite CIs, the multiple relations are combined (united) to form one relation. In some implementations, there can only be one relation between two composite CIs in each direction between the two composite CIs.

Figure 7:
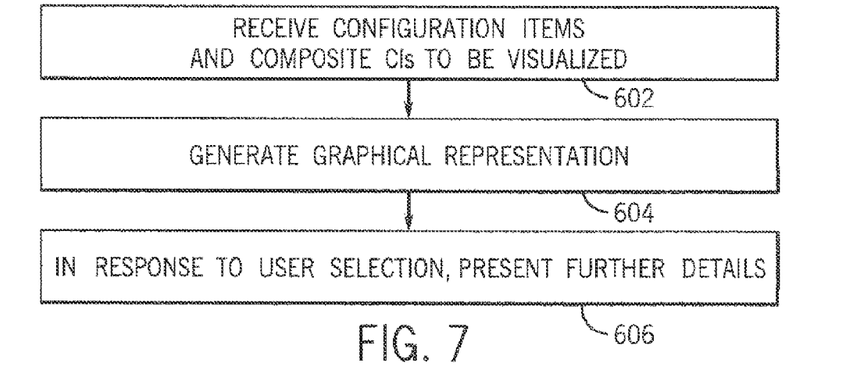
FIG. 7 is a flow diagram of a visualization process according to some embodiments.

FIG. 7 is a flow diagram of tasks performed by the visualization module 106 in the configuration item management module 102 of FIG. 2. The visualization module 106 receives (at 602) a collection of configuration items and composite CIs, which are to be visualized. Based on the relations among composite CIs and between a composite CI and a configuration item, a graphical visualization is generated (at 604), for display in the display device 124. In response to user selection, the visualization module 106 is able to present (at 606) further details regarding components of the graphical visualization, such as further details regarding a selected composite CI.

For example, the user can click on one of the composite CIs (or an individual configuration item) in the graphical representation of FIG. 5. In response to such selection, a dialog containing details of the selected composite CI can be presented. The dialog can contain the name of the selected composite CI, along with various attributes associated with the selected composite CI.

Alternatively, selection of a composite CI can also cause presentation of a dialog or visualization screen to depict configuration items in the selected composite CI. This allows the user to drill down into details of the composite CI, if desired.

Figure 8:
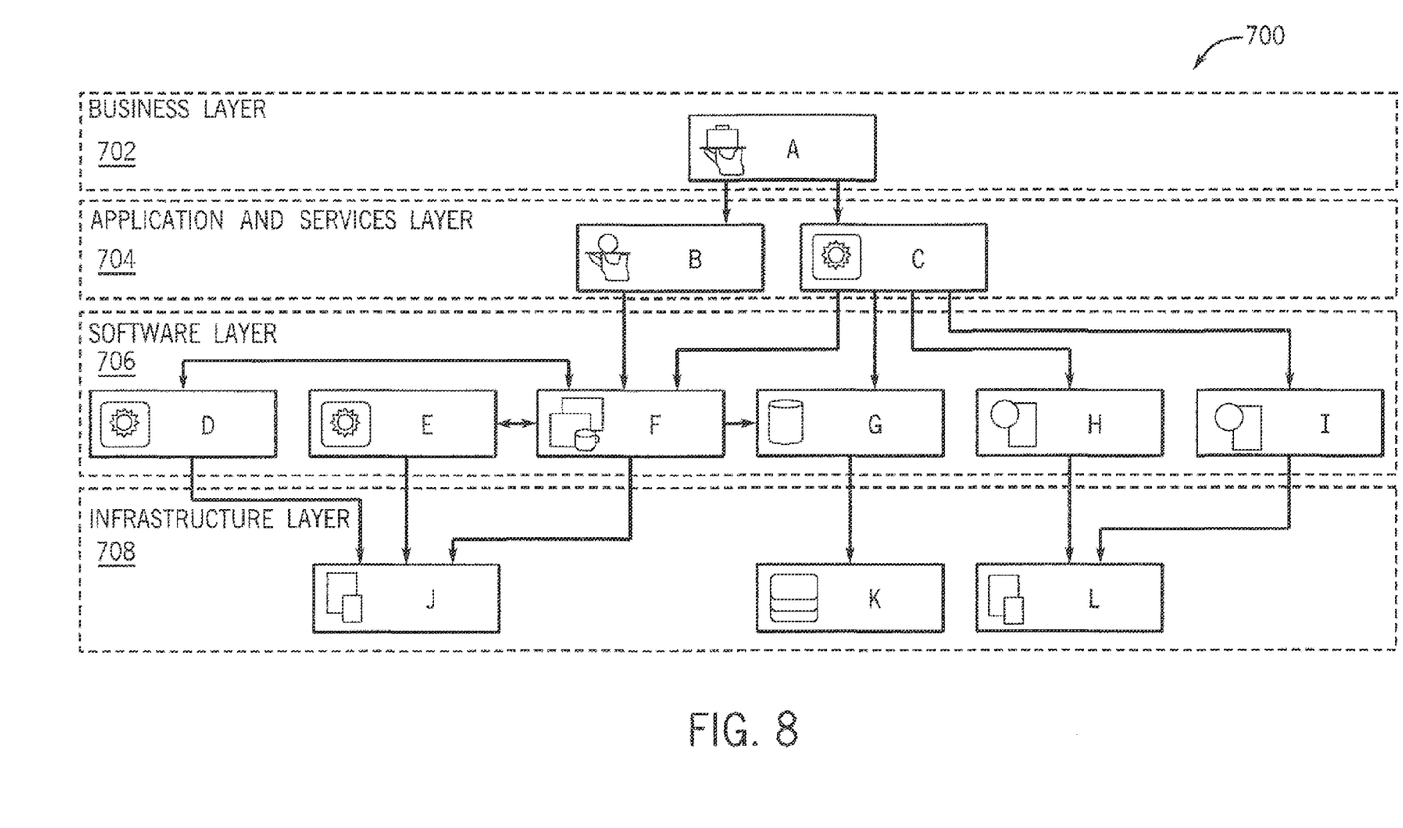
FIG. 8 is a graphical representation of linked composite configuration items in multiple layers, as produced by the configuration management system according to some embodiments.

In accordance with some implementations, to provide further organization, the configuration management system 100 is able to categorize composite CIs into layers (which can be user-defined layers) or alternatively into groups. Categorizing composite CIs into layers or groups improves the ability to read the topology of the composite CIs and to understand the relationships among them. In accordance with some examples, categorizing composite CIs into layers is shown in a graphical representation 700 in FIG. 8. The layers in the graphical representation 700 includes a business layer 702, an application and services layer 704, a software layer 706, an infrastructure layer 708. Other or alternative layers can be used in alternative implementations, such as a database layer or other type of layer. The layers 702, 704, 706, and 708 represent various different types of configuration items that are available in an environment that is being managed. The configuration management system 100 takes into account the corresponding category that each composite CI is categorized into, and places the composite CI in the corresponding layer in the graphical representation 700. The result is a well arranged visualization of the environment, with the user being able to easily understand which composite CIs belong to which layers of the environment. The different layers represent different aspects of the environment.

Figure 9:
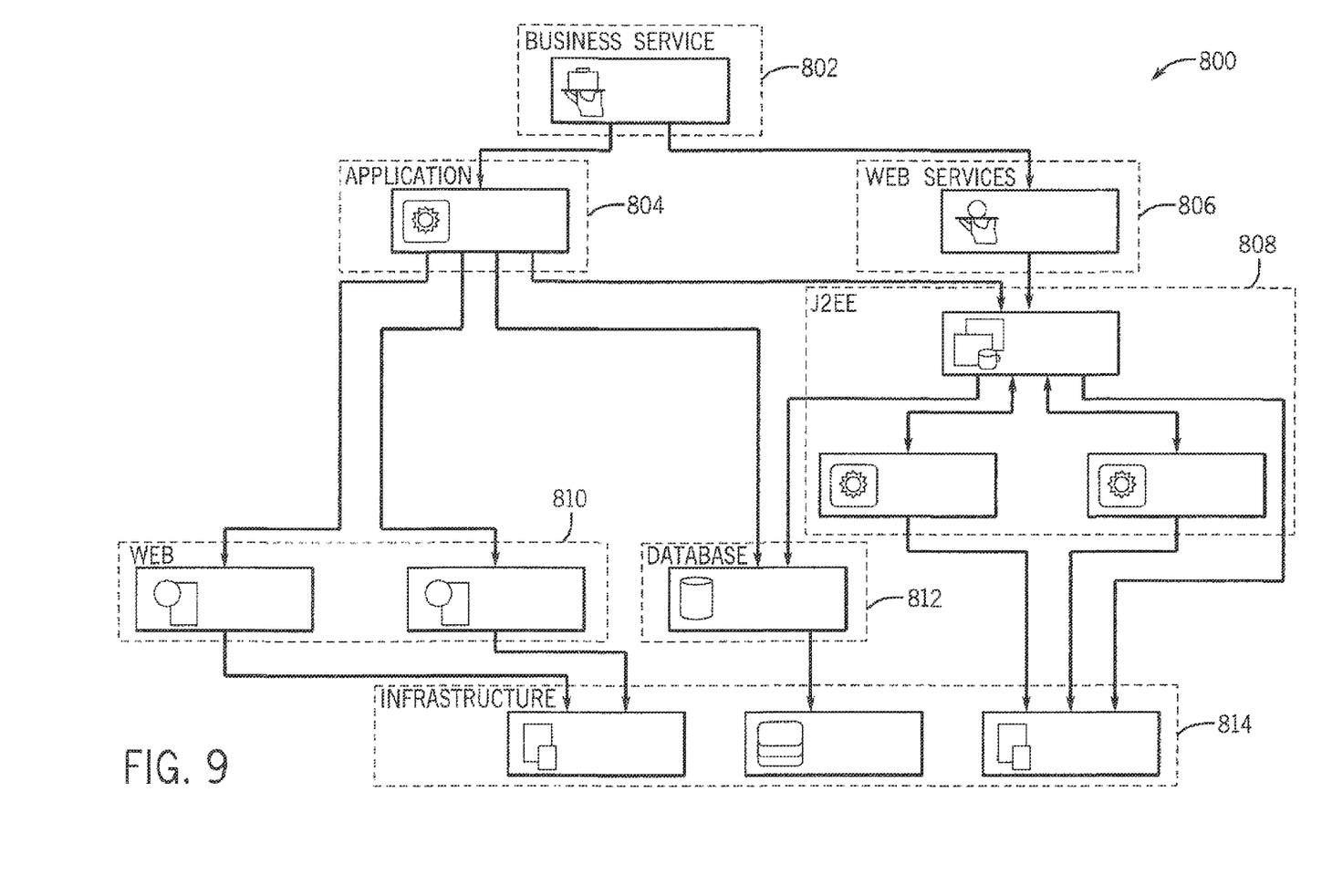
FIG. 9 is a graphical representation of linked composite configuration items that have been arranged into groups, as produced by the configuration management system according to further embodiments.

The fact that the layers are stacked on top each other provides another way of reading the topology of composite CIs. In some implementations, the layers can be configured in a way that a higher layer relays services from a lower layer. Also, the layered arrangement of FIG. 9 improves the ability to read which composite CIs are providing certain services, and which composite CIs relay information, In alternative implementations, in addition to or instead of categorizing composite CIs into layers, the configuration management system is also able to categorize composite CIs into groups. Some example groups are shown in a graphical representation 800 depicted in FIG. 9. The groups include a business service group 802, an application group 804, a web service group 806, a J2EE group 808, a web group 910, a database group 912, and an infrastructure group 914.

Machine-readable instructions described above (including instructions of modules 102, 104, 106 of FIG. 2) are loaded for execution on a processor (e.g., 108 in FIG. 2). A processor can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read--only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discuss above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    bundling by a configuration management system having a processor, configuration items representing corresponding information technology components into composite configuration items, each of the composite configuration items having plural associated configuration items, the bundling including,
        accessing settings of the configuration items to determine which of the configuration items to unite with which composite configuration items, and
        identifying neighbor configuration items in a topology of configuration items; and
    presenting by the configuration management system the composite configuration items for visualization, wherein the visualization specifies relations among the composite configuration items based on relations and topology among the configuration items.

2. The method of claim 1, further comprising:
    uniting relations between configuration items to form composite relations between composite configuration items.

3. The method of claim 1, further comprising:
    receiving a selection of a representation of a particular one of the composite configuration items to cause display of configuration items in the particular composite configuration item.

4. The method of claim 1, further comprising:
    categorizing the composite configuration items into plural different layers or groups representing different categories of configuration items.

5. The method of claim 4, wherein the plural layers or groups include plural ones of a business layer, infrastructure layer, application layer, software layer, and database layer.

6. The method of claim 1, wherein presenting the composite configuration items for visualization comprises generating a graphical representation of plural composite configuration items that are linked together.

7. The method of claim 6, wherein generating the graphical representation comprises including an individual configuration item in the graphical representation, wherein the individual configuration item is linked to at least one of the composite configuration items in the graphical representation.

8. The method of claim 1, wherein each of the configuration items defines a configuration of at least one of an electronic device, a portion of the electronic device, a software component, and a database component.

9. The method of claim 8, wherein each configuration includes an attribute associated with at least one of the electronic device, the portion of the electronic device, the software component, and the database component.

10. The method of claim 1, further comprising iteratively repeating the accessing and identifying to process the configuration items of the topology for uniting with respective composite configuration items.

11. The method of claim 1, wherein the presenting further includes presenting an individual configuration item not bundled into one of the composite configuration items upon determination that the individual configuration item could not be united with a neighbor configuration item from the topology.

12. The method of claim 1, wherein there can only be one relation between. two composite configuration items in each direction between the two composite configuration items.

13. An article comprising at least one machine-readable storage media storing instructions that upon execution cause a computer system to:
    receive a collection of configuration items to be managed;
    analyze settings associated with composite configuration items to combine groups of the configuration items into respective composite configuration items, wherein the configuration items represent corresponding information technology components;
    bundle the configuration items into the respective composite configuration items by accessing settings of the configuration items to determine which of the configuration items to unite with which composite configuration items and identifying neighbor configuration items in a topology of configuration items;
    determine relations among composite configuration items based on relations among the configuration items; and
    generate a visualization of the collection, wherein the visualization includes the composite configuration items, the relationships, and topology among the composite configuration items.

14. The article of claim 13, wherein the instructions upon execution cause the computer system to further categorize the composite configuration items into layers or groups.

15. The article of claim 13, further comprising instructions to:
    iteratively repeat the analyzing and identifying to process the configuration items of the topology for uniting with respective composite configuration items.

16. The article of claim 13 wherein the graphical representation further includes an individual configuration item not bundled into one of the composite configuration items upon determination that the individual configuration item could not be united with a neighbor configuration item from the topology.

17. The article of claim 13, wherein there can only be one relation between two composite configuration items in each direction between the two composite configuration items.

18. A computer system comprising:
a storage media to store information relating to configuration items that represent corresponding information technology components; and
at least one processor to:
identify groups of the configuration items to bundle the configuration items into composite configuration items, wherein each of the composite configuration items includes a corresponding one of the groups of configuration items;
bundle the configuration items into the composite configuration items by accessing settings of the configuration items to determine which of the configuration items to unite with which composite configuration items and identifying neighbor configuration items in a topology of configuration items;
unite relations among configuration items to form relations among composite configuration items; and
generate a graphical representation of the composite configuration items, wherein the graphical representation includes links among the composite configuration items based on the formed relations and topology among the composite configuration items.

19. The computer system of claim 18, wherein the processor also to iteratively repeat the accessing and identifying to process the configuration items of the topology for uniting with respective composite configuration items.

20. The computer system of claim 18, wherein the graphical representation further includes an individual configuration item not bundled into one of the composite configuration items upon determination that the individual configuration item could not be united with a neighbor configuration item from the topology.

* * * * *